June 24, 1924.
J. F. O'CONNOR
1,498,745
FRICTION SHOCK ABSORBING MECHANISM
Filed June 18, 1920
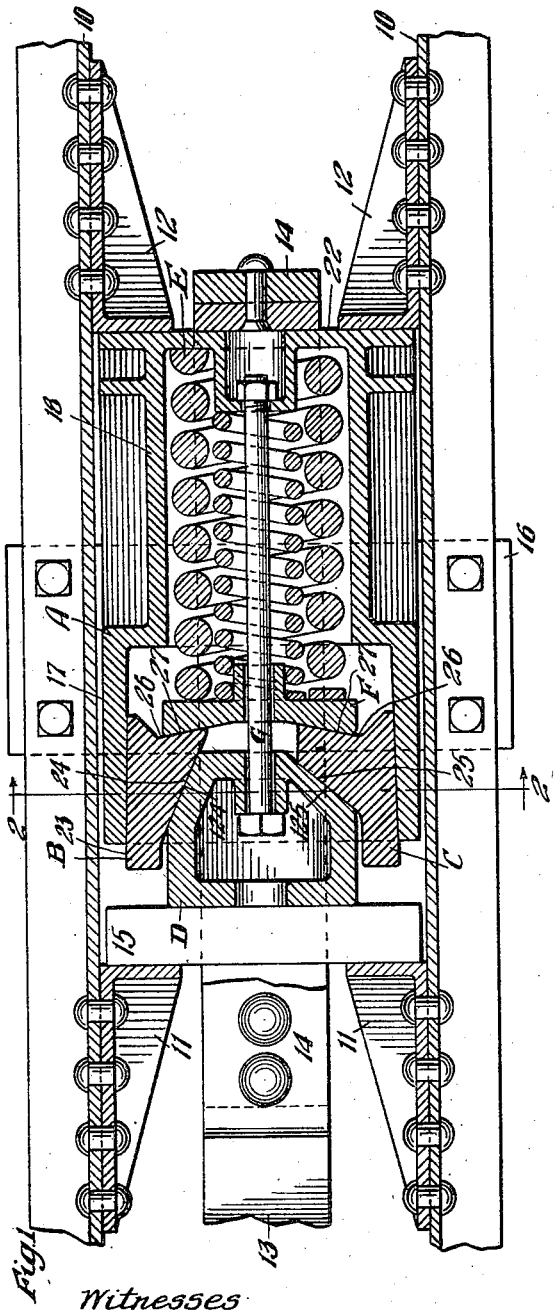
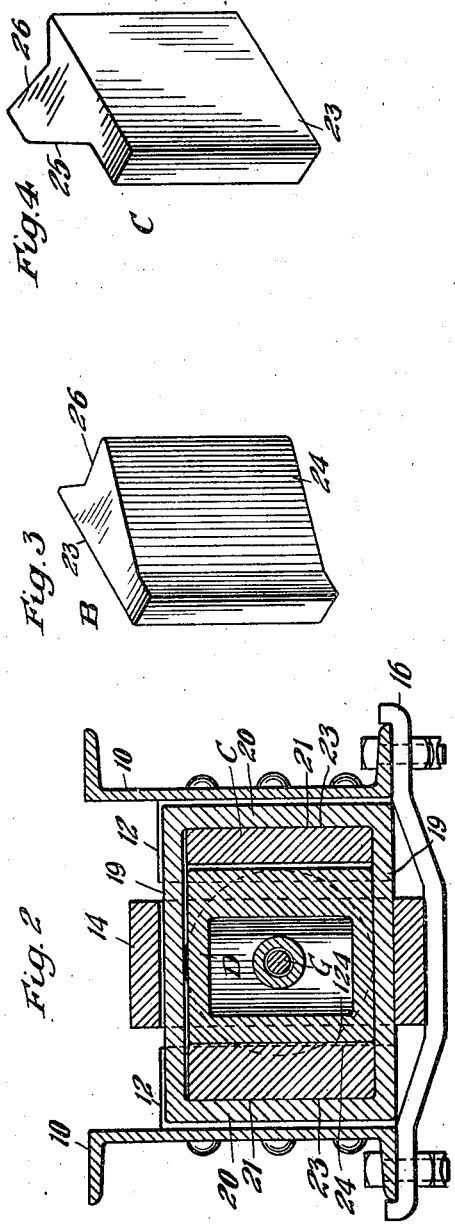
Witnesses
Wm. Geiger
Una C. Grigsby
Inventor
John F. O'Connor
By Geo. I. Haight
His Atty.

Patented June 24, 1924.

1,498,745

UNITED STATES PATENT OFFICE.

JOHN F. O'CONNOR, OF CHICAGO, ILLINOIS, ASSIGNOR, BY MESNE ASSIGNMENTS, TO W. H. MINER, INC., A CORPORATION OF DELAWARE.

FRICTION SHOCK-ABSORBING MECHANISM.

Application filed June 18, 1920. Serial No. 389,800.

*To all whom it may concern:*

Be it known that I, JOHN F. O'CONNOR, a citizen of the United States, residing at Chicago, in the county of Cook and State of Illinois, have invented a certain new and useful Improvement in Friction Shock-Absorbing Mechanisms, of which the following is a full, clear, concise, and exact description, reference being had to the accompanying drawings, forming a part of this specification.

This invention relates to improvements in friction shock absorbing mechanisms.

One object of the invention is to provide a friction shock absorbing mechanism, especially adapted for railway draft riggings, wherein is obtained high capacity, the mechanism consisting of few parts and so arranged as to insure certain release.

Another object of the invention is to provide a friction shock absorbing mechanism of the character indicated wherein a keen angle wedging effect is obtained in compression and a blunt angle effect in release, thus permitting of substantially any desired high frictional capacity accompanied by certain release, and all without the necessity of anti-friction rollers, anti-friction pads or other corresponding expedients that have heretofore been deemed necessary.

A still further object of the invention is to provide a friction shock absorbing mechanism of the character indicated wherein are employed a friction shell, friction shoes, and spreading means, the friction shoes and spreading means having cooperating sets of engaging faces, certain of which produce a keen angle wedging action in compression and blunt, non-wedge acting effect in release, and certain of which are of blunt, substantially non-wedge acting effect in compression and of wedge acting effect in release.

A specific object of the invention is to provide spreading means, preferably in the form of a single integral wedge, which presents both keen, true wedge acting surfaces and substantially blunt non-wedge acting surfaces during the compression action, the function of said surfaces being reversed, in effect, during release.

Other objects of the invention will more clearly appear from the description hereinafter following.

In the drawing forming a part of this specification, Figure 1 is a horizontal longitudinal sectional view of a portion of a railway draft rigging showing my improvements employed in connection therewith. Figure 2 is a vertical transverse sectional view taken substantially on the line 2—2 of Figure 1. And Figures 3 and 4 are detail perspectives of the two friction shoes employed in my construction as illustrated in Figure 1.

In said drawing, 10—10 denote channel-shaped center or draft sills of a railway car, on the inner faces of which are secured front stop lugs 11—11 and rear stop lugs 12—12, spaced the usual distance apart. A portion of a draw bar is indicated at 13, to which is rigidly attached a yoke 14 of well-known form, and within which the shock absorbing mechanism proper hereinafter described is contained, as is also a front follower 15. The yoke and associated movable parts are adapted to be supported by a detachable saddle plate 16.

In the specific embodiment of my invention illustrated, I employ, broadly, a combined friction shell and spring cage casting A; a pair of friction shoes B and C; a single wedge D; a spring E; a spring follower F; and a retainer bolt G.

The casting A is formed with the friction shell proper 17 at the forward end thereof and with the spring cage or casing 18 rearwardly thereof. The shell 17 is of substantially hollow rectangular box-like form having upper and lower walls 19—19 and side walls 20—20. The inner faces of the side walls 20—20 provide a pair of longitudinally extending friction surfaces 21—21. In actual practice the surfaces 21—21 will be made slightly inwardly converging but not to such an extent as to intentionally produce any appreciable differential action of the friction elements as has heretofore been contemplated. The slight convergence of the friction surfaces 21 is for a double purpose—one relating to the manufacturing conditions and the other to the action of the shell during the compression and release. By making the surfaces 21 slightly converging, I avoid all possibility of the distance between said surfaces at any point inwardly of the mouth being greater than the distance therebetween at the mouth of the shell, while, at the same time, allowing for the variations in foundry manufacture which are permitted in commercial practice. Where the interior of friction shells are primarily designed to be truly parallel, it may happen that, in molding or casting, the surfaces are made divergent inwardly of the mouth of the shell so that the mouth forms a contracted opening which interferes with the proper release of the friction elements, as will be understood by those skilled in the art. The other function of the slightly tapered shell will be more fully explained hereinafter in connection with the operation of the device.

The spring cage 18 may be made cylindrical to accommodate and properly center the spring E and at its rear end is preferably formed with an integral wall 22 adapted to act as the rear follower of the mechanism.

The friction shoes B and C, while of generally similar construction, differ with respect to their inclined faces. Each shoe is, of course, provided on its exterior with a flat friction surface 23 adapted to co-operate with the respective friction shell surface 21. On its interior side the shoe B is formed with an inclined face 24 which extends at a relatively acute or keen angle with respect to the axis of the shell or center line of draft. The shoe C is provided on its inner side with an inclined face 25 which extends at a relatively blunt angle with respect to the axis of the shell. The wedge D is formed with correspondingly inclined faces 124 and 125. The action of these faces will be detailed hereinafter.

Each of the shoes B and C is formed at its inner end with a rearwardly inwardly inclined surface 26 and with which are adapted to co-operate correspondingly inclined surfaces 27 on the outer face of the follower F. As will be observed from an inspection of Figure 1, one end of the spring E bears against the inner side of the follower F, the other end of the spring bearing against the rear of the casting A.

The bolt G passes through suitable openings in the wedge D, the follower F and rear wall 22, and serves the dual function of holding the parts in assembled relation and also of maintaining the spring under an initial compression, if desired.

The faces 25 and 125 are extended at such a blunt angle with respect to the axis of the mechanism so as to prevent any substantial wedging, sliding or spreading action between the wedge D and shoe C from the forces transmitted substantially longitudinally or parallel to the axis in either buff or draft. The angle of said faces 25 and 125 will vary in accordance with the materials employed and the slight taper of the shell, but will be such that it has slight, if any, wedging effect or is of substantially non-wedging effect during the compressive stroke so far as buffing or pulling forces parallel to the axis are concerned. The angle or inclination of the faces 24 and 124 will be made relatively acute, and, in fact, much more acute than has heretofore been deemed successfully possible in a friction mechanism wherein the wedging or spreading action is imposed directly by a single pressure-transmitting wedge on friction shoes proper, and the reason that I am enabled to make the angle of the faces 24 and 124 so acute is that the release is not initially effected between said faces, as hereinafter explained.

The operation is as follows: Assuming an inward or buffing movement of the draw bar, the wedge D will be forced rearwardly, and, the wedging or spreading effect of the wedge D will occur entirely or substantially entirely between the wedge D and the shoe B, sliding, or wedging action on the faces 25 and 125 being entirely negligible. Obviously, there will be an equal reaction which will force the wedge D transversely against the shoe C so that the pressure between the shoes B and C and the shell will be equalized. In the carrying out of my invention, the capacity of the spring will afford some resistance, but the greater part of the resistance is obtained purely by the friction generated between the shoes and shell, the spring E performing the function of returning or restoring the friction elements when they are released.

At the end of the compressive stroke and upon removal of the actuating force, it is evident that tremendous forces will be stored up in the friction shell which has been expanded. Consequently, the shell will contract and the forces therefrom will be exerted radially inwardly on the shoes. Considering first the contraction of the shell with respect to the release action, it is obvious that the faces 24 and 124 extend at a relatively blunt or non-releasing angle with respect to such radial forces and, consequently, the faces 24 and 124 are not effective during initial release. Conversely, the faces 25 and 125 which are of any suitable releasing angle, oppose no resistance or sticking action to the radially inward contracting forces of the shell so that said face 25 acts as a wedge at this time to free the wedge D from the shoe B or otherwise leaving loose or loosening such wedge; whereupon the group of friction elements collapses sufficiently for the spring to restore all parts to normal position, the parts properly positioning themselves with relation to each other at the end of the release action, inasmuch as there is sufficient looseness to permit thereof. Irrespective of the contracting forces of the shell and considering the wedge D at the moment when the buffing or compressing force ceases, it is free to drop away from the shoe B, the face 25 of the shoe C opposing no resistance to such movement. The initial collapse or break in the friction elements, therefore, occurs between the faces 25 and 125. During the release, the inclined arrangement of faces 26 and 27 of the shoes and spring follower also assist slightly in loosening or maintaining loose, the inner ends of the shoes from the slightly outwardly diverging friction surfaces 21, the forces from the spring being obviously transmitted from the follower F to the shoes in lines which converge outwardly of the shell. The taper of the shell as hereinbefore described, is of further assistance in insuring restoration of all of the parts to normal position, inasmuch as the friction parts, when collapsed or released, may readily be projected outwardly under the influence of the spring without danger of the shoes catching or jamming with the shell walls.

With my improvements, it will be observed that I can obtain substantially any desired wedging effect and at the same time insure certain release. The design is exceedingly simple; consists of few parts; the wedge and friction elements may be readily manufactured as ordinary castings and there are no delicate parts to get out of order.

By the term "wedging" as herein used and applied to the faces 24 and 124, I mean that, during a compression stroke of the mechanism, the face 124 will slip on the face 24. By the term "non-wedging", as herein used and applied to the faces 25 and 125, I mean that, in a compression movement of the mechanism, there will be no appreciable slippage of either of the faces 25 and 125 on the other. If there should be such slippage in either direction, it does not interfere in any way with the operation of the mechanism during compression and the certain result is that the release of the mechanism will take place without difficulty by reason of the blunt angle of said faces 25 and 125.

Although I have herein shown and described what I now consider the preferred manner of carrying out the invention, the same is merely illustrative and by way of description only and not by way of limitation. I believe I am the first to provide a friction shock absorbing mechanism having the pressure-applying wedge formed with opposing and inclined wedging and non-wedging faces, the former for producing high capacity and the latter to insure certain release and intend to claim the same broadly. A mechanism constructed as herein disclosed, obtains the results herein set forth and I believe the mode of operation hereinbefore described to be correctly stated. All changes and modifications are contemplated that come within the scope of the claims appended hereto.

I claim:

1. In a friction shock absorbing mechanism, the combination with a friction shell having interior friction surfaces; of friction shoes co-operable with said shell, the inner ends of said shoes having faces extending inwardly and rearwardly; a spring; a follower interposed between the spring and shoes, said follower having faces engaging and co-operating with the said faces at the inner ends of the shoes; and spreader means co-operable with said shoes, said shoes and spreader means having faces arranged in part at a relatively keen wedge acting angle and in part at a relatively blunt non-wedge acting angle during the compression stroke.

2. In a friction shock absorbing mechanism, the combination with a friction shell having interior friction surfaces slightly inwardly converging; of friction shoes co-operable with said shell, the inner ends of said shoes having faces extending inwardly and rearwardly; a spring; a follower interposed between the spring and said shoes, said follower having co-operating faces engaging the faces at the inner ends of the shoes; and combined pressure transmitting and wedge acting means co-operable with said shoes.

3. In a friction shock absorbing mechanism, the combination with a friction shell having a pair of opposed flat inner friction surfaces slightly inwardly converging; of a plurality of friction shoes co-operable with said friction surfaces of the shell; a spring; and a single piece pressure transmitting and wedge acting element, said element and one of the shoes having co-operating sets of faces arranged at a relatively keen wedge acting angle during the compression stroke, said element and a different shoe having co-operating sets of faces extending at a relatively blunt non-wedge acting angle during the compression stroke.

4. In a friction shock absorbing mechanism, the combination with a friction shell having a pair of interior slightly converging opposed friction surfaces; of a pair of friction shoes co-operable with said shell, one of said shoes having an inner face extending at a relatively keen angle with respect to the axis of the shell, the other shoe having a face extending at a relatively blunt angle with respect to the axis of the shell, both shoes having faces at their inner ends extending inwardly and rearwardly at a relatively blunt angle with respect to the axis of the shell; a spring; a follower interposed between the spring and the inner ends of the shoes, said follower having faces engaging and co-operable with said faces at the inner ends of the shoes; and a wedge having faces engaging and co-operable with said inner faces of the two shoes.

5. In a friction shock absorbing mechanism, the combination with a friction shell and a spring cage, the interior of said shell having an opposed pair of flat, longitudinally extending friction surfaces; of a spring mounted within the cage; a pair of friction shoes co-operable with the shell, one of said shoes having a face extending at a relatively keen wedge acting angle with respect to the axis of the shell and the other shoe having a face extending at a relatively blunt non-wedge acting angle with respect to the axis of the shell; and a single piece wedge co-operable with the shoes, said wedge having correspondingly keen and blunt angle faces engaging the corresponding faces of the shoes.

6. In a friction shock absorbing mechanism, the combination with a friction shell and a spring cage, the interior of the shell being provided with a pair of opposed longitudinally extending friction surfaces slightly inwardly converging; of a spring disposed within the cage; a pair of friction shoes co-operable with the shell, both shoes having faces at their inner ends inclined rearwardly toward, and at a relatively blunt angle with respect to, the axis of the shell, one of said shoes having an inner face extending at a relatively keen wedge acting angle with respect to the axis of the shell, the other shoe having an inner face extending at a relatively blunt non-wedge acting angle with respect to the axis of the shell; a wedge co-operable with the shoes and having both keen and relatively blunt angle faces engaging the corresponding inner faces of the shoes; and a follower interposed between the spring and the inner ends of the shoes and having inclined faces engaging and co-operable with said inner end faces of the shoes.

In witness that I claim the foregoing I have hereunto subscribed my name this 7th day of June 1920.

JOHN F. O'CONNOR.

Witness:
CARRIE GAILING.